(12) United States Patent
Currier et al.

(10) Patent No.: US 7,989,370 B2
(45) Date of Patent: Aug. 2, 2011

(54) INTERIOR WALLBOARD AND METHOD OF MAKING SAME

(75) Inventors: Alan Currier, Atlanta, GA (US); Russell Smith, Convington, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 963 days.

(21) Appl. No.: 10/957,745

(22) Filed: Oct. 5, 2004

(65) Prior Publication Data
US 2005/0266225 A1 Dec. 1, 2005

Related U.S. Application Data

(60) Provisional application No. 60/534,364, filed on Jan. 6, 2004, provisional application No. 60/511,638, filed on Oct. 17, 2003.

(51) Int. Cl.
| | |
|---|---|
| B32B 5/26 | (2006.01) |
| B32B 13/02 | (2006.01) |
| B32B 17/02 | (2006.01) |
| B32B 25/02 | (2006.01) |

(52) U.S. Cl. ........ 442/386; 422/381; 422/348; 422/180; 428/294.7

(58) Field of Classification Search ............... 428/294.7, 428/297.4, 299.4, 703, 219, 220; 442/17, 442/19, 29, 43–45, 58, 60, 76, 78, 79, 85, 442/180, 290, 288, 283–285
See application file for complete search history.

(56) References Cited

U.S. PATENT DOCUMENTS

| | | |
|---|---|---|
| 1,844,084 A | 2/1932 | Weber |
| 2,906,660 A | 9/1959 | Hungerford et al. |
| 3,012,929 A | 12/1961 | Jackson |
| 3,050,427 A | 8/1962 | Slayter et al. |
| 3,103,461 A | 9/1963 | Smith et al. |
| 3,228,825 A | 1/1966 | Waggoner |
| 3,455,710 A | 7/1969 | Nitzsche et al. |
| 3,516,882 A | 6/1970 | Cummisford |
| 3,623,895 A | 11/1971 | Nitzsche et al. |

(Continued)

FOREIGN PATENT DOCUMENTS

| | | |
|---|---|---|
| CA | 993779 | 7/1976 |

(Continued)

OTHER PUBLICATIONS

Specification in U.S. Appl. No. 10/798,891, filed Mar. 12, 2004, with three sheets of drawings Figs. 1-4.

(Continued)

*Primary Examiner* — Kevin R. Kruer

(57) ABSTRACT

A gypsum wallboard suitable for Level 4 finishing having a coated non-woven glass fiber mat facing material where the glass fiber mat has a majority of fibers of a fiber diameter between 8 and 11 microns and a fiber length between ¼ and ¾ inch and preferably between ¼ and ½ inch and preferably has a basis weight between about 0.8 lb./100 ft.$^2$ and about 2.2 lb./100, and wherein the fibers in the non-woven glass fiber are bound together with an acrylic adhesive binder and wherein the non-woven glass mat has a coating of a dried aqueous mixture of (i) a mineral pigment, (ii) a polymer latex adhesive binder and optionally (iii) an inorganic adhesive binder such that the coated non-woven glass mat facing material has a porosity which allows water to evaporate through said coated mat from the gypsum core during preparation of the wallboard.

26 Claims, 2 Drawing Sheets

(not to scale)

U.S. PATENT DOCUMENTS

| | | | |
|---|---|---|---|
| 3,760,458 A | 9/1973 | Pitt | |
| 3,766,003 A | 10/1973 | Schuller et al. | |
| 3,824,147 A | 7/1974 | Baird | |
| 3,838,995 A | 10/1974 | Smith | |
| 3,905,067 A | 9/1975 | Keib et al. | |
| 3,935,021 A | 1/1976 | Greve et al. | |
| 3,945,965 A | 3/1976 | Ramig, Jr. et al. | |
| 3,947,398 A | 3/1976 | Williams | |
| 3,993,822 A | 11/1976 | Knauf et al. | |
| 4,067,939 A | 1/1978 | Lowe et al. | |
| 4,073,997 A | 2/1978 | Richards et al. | |
| 4,112,174 A | 9/1978 | Hannes et al. | |
| 4,129,674 A | 12/1978 | Hannes et al. | |
| 4,136,687 A | 1/1979 | Dabroski | |
| 4,233,353 A | 11/1980 | Bondoc et al. | |
| 4,265,979 A | 5/1981 | Baehr et al. | |
| 4,303,722 A | 12/1981 | Pilgrim | |
| 4,378,405 A | 3/1983 | Pilgrim | |
| 4,394,414 A | 7/1983 | Brown et al. | |
| 4,447,498 A | 5/1984 | Fink et al. | |
| 4,477,300 A | 10/1984 | Pilgrim | |
| 4,494,990 A | 1/1985 | Harris | |
| 4,504,533 A | 3/1985 | Altenhofer et al. | |
| 4,572,861 A | 2/1986 | Barretto Garcia et al. | |
| 4,631,097 A | 12/1986 | Kossuth | |
| 4,637,951 A | 1/1987 | Gill et al. | |
| 4,643,771 A | 2/1987 | Steinbach et al. | |
| 4,647,496 A | 3/1987 | Lehnert et al. | |
| 4,681,802 A | 7/1987 | Gaa et al. | |
| 4,784,897 A | 11/1988 | Brands et al. | |
| 4,810,576 A | 3/1989 | Gaa et al. | |
| 4,876,142 A | 10/1989 | Piccirillo | |
| 4,879,173 A | 11/1989 | Randall | |
| 4,916,004 A | 4/1990 | Ensminger et al. | |
| 4,948,647 A | 8/1990 | Burkard | |
| 5,001,005 A | 3/1991 | Blanpied | |
| 5,102,728 A | 4/1992 | Gay et al. | |
| 5,112,678 A | 5/1992 | Gay et al. | |
| 5,135,805 A | 8/1992 | Sellers et al. | |
| 5,256,222 A | 10/1993 | Shepherd et al. | |
| 5,308,692 A | 5/1994 | Kennedy et al. | |
| 5,342,680 A | 8/1994 | Randall | |
| 5,389,716 A | 2/1995 | Graves | |
| 5,395,685 A | 3/1995 | Seth et al. | |
| 5,397,631 A | 3/1995 | Green et al. | |
| 5,484,653 A | 1/1996 | Kennedy et al. | |
| 5,514,744 A | 5/1996 | Brown | |
| 5,552,187 A | 9/1996 | Green et al. | |
| 5,718,785 A | 2/1998 | Randall | |
| 5,772,846 A * | 6/1998 | Jaffee | 162/145 |
| 5,883,021 A | 3/1999 | Beer et al. | |
| 5,883,024 A | 3/1999 | O'Haver-Smith et al. | |
| 5,965,257 A | 10/1999 | Ahluwalia | |
| 5,981,406 A | 11/1999 | Randall | |
| 6,001,496 A | 12/1999 | O'Haver-Smith | |
| 6,221,521 B1 | 4/2001 | Lynn et al. | |
| 6,365,533 B1 | 4/2002 | Homer, Jr. et al. | |
| 6,387,172 B1 | 5/2002 | Yu et al. | |
| 6,391,131 B1 | 5/2002 | Newman et al. | |
| 6,524,679 B2 | 2/2003 | Hauber et al. | |
| 6,703,331 B1 * | 3/2004 | Bruce et al. | 442/386 |
| 6,723,670 B2 | 4/2004 | Kajander et al. | |
| 6,737,156 B2 | 5/2004 | Koval et al. | |
| 6,770,354 B2 | 8/2004 | Randall et al. | |
| 6,808,793 B2 | 10/2004 | Randall et al. | |
| 7,049,251 B2 | 5/2006 | Porter | |
| 7,300,515 B2 | 11/2007 | Porter | |
| 7,300,892 B2 | 11/2007 | Porter | |
| 2002/0155282 A1 | 10/2002 | Randall et al. | |
| 2002/0187298 A1 | 12/2002 | Hauber et al. | |
| 2003/0134079 A1 | 7/2003 | Bush et al. | |
| 2003/0175478 A1 | 9/2003 | Leclercq | |
| 2003/0203191 A1 * | 10/2003 | Randall et al. | 428/341 |
| 2003/0211305 A1 | 11/2003 | Koval et al. | |
| 2004/0170873 A1 | 9/2004 | Smith | |
| 2004/0209071 A1 | 10/2004 | Carbo et al. | |
| 2004/0209074 A1 * | 10/2004 | Randall et al. | 428/341 |
| 2004/0266303 A1 | 12/2004 | Jaffee | |
| 2004/0266304 A1 | 12/2004 | Jaffee | |
| 2006/0240236 A1 | 10/2006 | Bland et al. | |
| 2007/0026185 A1 | 2/2007 | Fay et al. | |

FOREIGN PATENT DOCUMENTS

| | | |
|---|---|---|
| DE | 2808723 | 9/1979 |
| DE | 3508933 | 9/1986 |
| EP | 0154094 | 11/1985 |
| GB | 1250713 | 10/1971 |
| GB | 2 022 503 A | 12/1979 |
| GB | 2023687 | 1/1980 |
| GB | 2097837 | 11/1982 |
| JP | 2001020445 A | 1/2001 |

OTHER PUBLICATIONS

Dialog Printout for DE 3508933.

Translation of DE 2808723.

International Search Report dated Apr. 13, 2005.

International Search Report for PCT/US2004/032301 mailed Sep. 8, 2006.

Gypsum Association Pamphlet—Matrix Edition: Recommended Levels of Gypsum Board Finish. GA-214-M-97. (Publication Date Unknown).

Gypsum Association Pamphlet—Recommended Levels of Gypsum Board Finish. GA-214-96. (Publication Date Unknown).

Georgia-Pacific DensArmor Plus Paperless Interior Drywall; 2007 Georgia-Pacific Gypsum LLC Lit Item # 531259; www.densarmorplus.com.

Georgia-Pacific DensShield Tile Backer; 2006 Georgia Pacific Gypsum Corporation; Lit Item # 101515; www.densshield.com.

G-P Gypsum DensDeck Roof Board; 2006 G-P Gypsum Corporation; Lit. Item 101516; www.densdeck.com.

Rouette, Hans-Karl Encyclopedia of Textile Finishing. (pp. 67-79 & 140). Woodhead Publishing, 2001. Online version available at http://www.knovel2/Toc.jsp?BookID=1225&VerticalID=0.

* cited by examiner (not to scale)

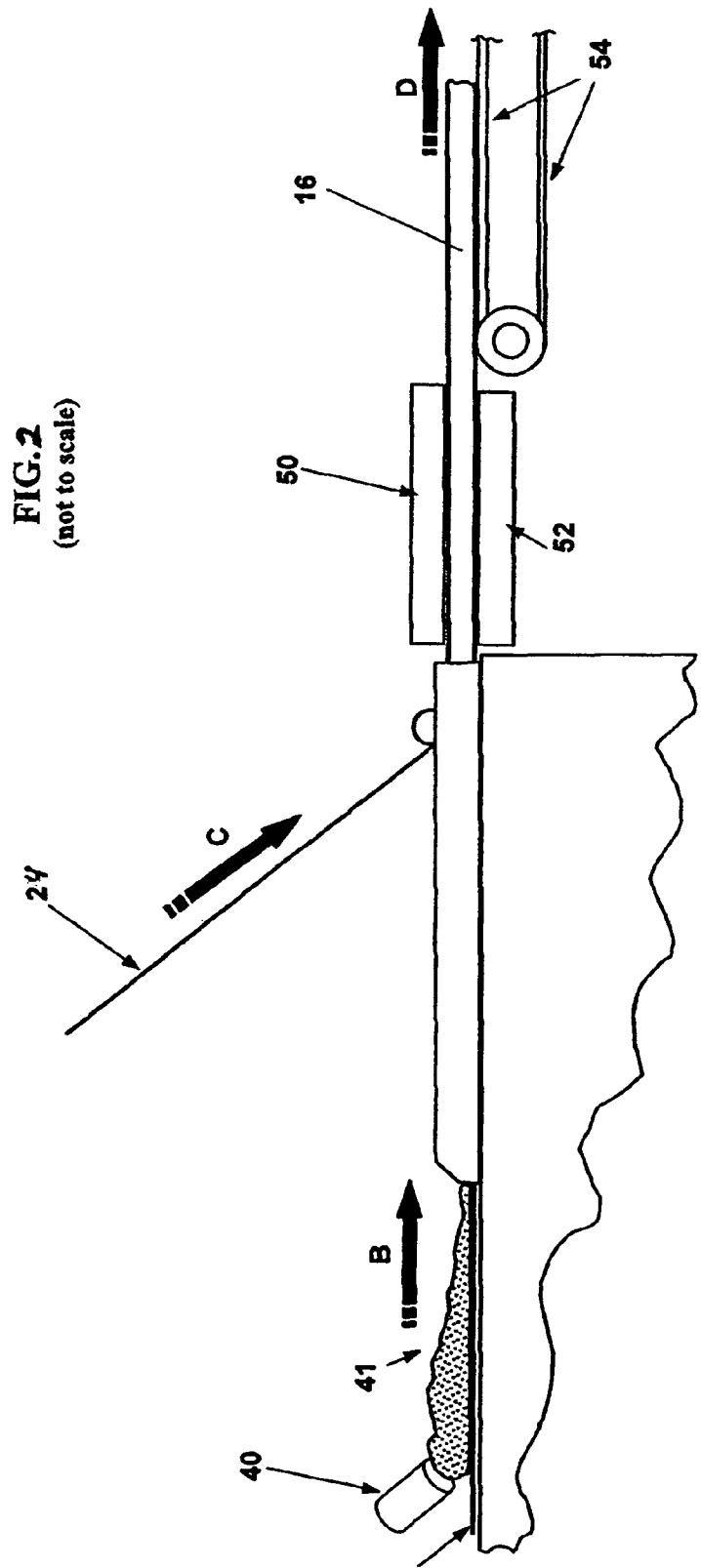

INTERIOR WALLBOARD AND METHOD OF MAKING SAME

CROSS REFERENCE TO RELATED APPLICATIONS

This application claims the benefit under 35 U.S.C. 119 (e)(1) of prior filed provisional application 60/534,364 filed on Jan. 6, 2004 and 60/511,638 filed on Oct. 17, 2003.

FIELD OF THE INVENTION

This invention relates to an improved gypsum wallboard faced with a glass fiber mat. More particularly, the present invention relates to a gypsum wallboard covered with a glass fiber mat, especially a coated glass mat suitable for interior use. The glass mat faced gypsum board of this invention is suitable for Level 4 finishing (GA-214-96).

BACKGROUND OF THE INVENTION

The building industry widely uses gypsum wallboard, consisting of a core of set gypsum sandwiched between two sheets of multi-ply paper facing material in the construction of residential homes, commercial buildings, and other structures. The use of paper-faced gypsum wallboard has become one of the most common means of finishing the interior structure of buildings. Paper-faced gypsum wallboard, also known as sheetrock or drywall is usually manufactured (pre-cut) in flat sheets of 4 ft. by 8 ft., or 4 ft. by 12 ft., typically having a thickness of ½" or ⅝". The sheets of the paper-faced gypsum wallboard are hung on wood or metal studs to form the interior partitions or walls of rooms, elevator shafts, stairwells, ceilings and the like.

Conventional paper-faced gypsum wallboard is typically manufactured from a slurry of stucco (calcined gypsum slurry) wherein the slurry is placed between two layers of multi-ply paper facers and the slurry is allowed to set. In typical paper-faced gypsum wallboard, the two layers of multi-ply paper facers contain/restrain the slurry while it sets and provides the strength required in installation and use. The set gypsum is a hard and rigid product obtained when the calcined gypsum reacts with water to form calcium sulfate dihydrate.

During wallboard production, water in excess of that needed to hydrate the calcined gypsum must be removed from the slurry during the curing. While a certain amount of water is required to hydrate the calcined gypsum, excess water must be added, e.g., on the order of two, or more times than that actually needed to hydrate the calcined gypsum, in order to obtain a smooth, free-flowing slurry suitable for transporting and then depositing on the facing sheet to form the board core. This excess water must be evaporated primarily through the facing sheets as the board is cured and dried.

Gypsum wallboard is typically made as a continuous product on an endless conveyor using rolls of the paper facing material. The board is cut into discrete lengths to accommodate subsequent handling and then dried in heated dryers until the discrete boards are completely dry. The quality of the paper facers determines the kind of applications suitable for using the boards and the surface treatments that may be used on the boards.

The paper facers usually employed in the production of paper-faced gypsum wallboards consist of two types. The facer used on the side of the wallboard intended to face the interior of a room is of a multi-ply construction with the outer plies usually composed of a better grade of paper. This allows the smooth surface board to be finished in a variety of aesthetically acceptable ways, especially by painting. The inner plies, including the one that contacts with the board core is usually made of repulped newsprint and recycled corrugated boxes. The paper facer used on the backside of the board is usually made of a plurality of plies of the lower grade of paper, e.g., the repulped newsprint and corrugated boxes.

Multi-ply paper facings have long been used because they provide a unique combination of properties. Paper is able to form a satisfactory bond with the set gypsum, particularly gypsum with added binder, e.g., starch, so that the facing is not easily delaminated from the set gypsum core. As noted above, water that is added to prepare the gypsum slurry and that does not chemically combine with the stucco (calcined gypsum) must evaporate mainly through any facing sheets without causing delamination. Paper is sufficiently porous to allow the water vapor to permeate through it during gypsum wallboard manufacture. Paper also presents a smooth surface that can easily be finished in a number of ways, such as by application of wallpaper or especially by painting, with minimal surface preparation.

Although paper is a relatively inexpensive facing material and is easily used in the process of manufacturing wallboard, it has disadvantages, particularly with regard to moisture-resistance. Moisture can have deleterious effects upon paper-faced wallboard. In addition to degrading strength and other structural properties, moisture (in combination with other factors) can encourage the growth of fungi (including, e.g., mold). The problem can (under certain circumstances) be particularly acute with regard to certain spaces that, upon installation of the wallboard, are enclosed and inaccessible.

As an alternative to paper facing, gypsum wallboard can also be manufactured with a fibrous mat (such as a mat of glass fibers) as a facing material. Examples of such wallboards include those described in, e.g., U.S. Pat. No. 3,993,822, U.S. Pat. No. 5,644,880, U.S. Pat. No. 5,791,109, U.S. Pat. No. 5,883,024 and U.S. Pat. No. 6,001,496. In addition to improved water resistance, fibrous matting, and especially glass fiber matting often provides significant improvements in strength and other desired structural attributes.

Although such fibrous mats may be a more advantageous facing material than paper in many respects, particularly with respect to their moisture resistance for exterior applications, it is less desirable than paper in other respects. In particular, the prior art wallboard products made with glass or other similar fiber mat facing materials provide a less desirable (generally more irregular or rough) wall surface for finishing in many applications and thus less aethetic. Interior walls, for example, are often finished with paint or wallpaper. While paper facing offers a smooth surface for painting or papering, the prior art fibrous facing and especially common glass fiber facing sheets, do not.

BRIEF DESCRIPTION OF THE DRAWINGS

The features and advantages of the invention will be apparent from the following more detailed description of certain embodiments of the invention and as illustrated in the accompanying drawings in which reference characters refer to the same parts throughout the various views. The drawings are not to scale, emphasis instead being placed upon illustrating the features of the invention.

FIG. 2 is a partial highly schematic view of a portion of a wallboard production line.

DETAILED DESCRIPTION OF THE INVENTION

Figure 1:
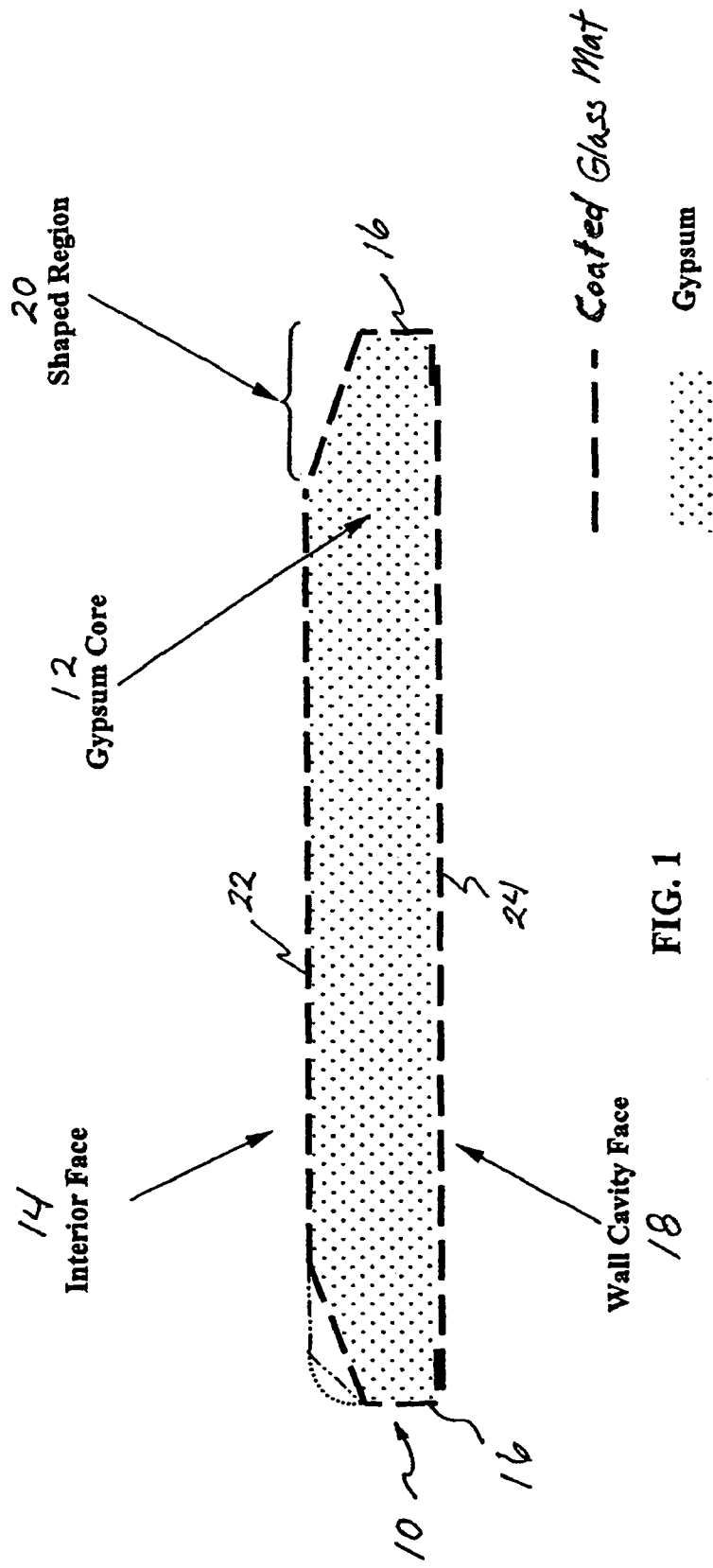
FIG. 1 is a schematic cross section of a coated glass mat faced wallboard according to the present invention.

According to the present invention, a gypsum wallboard is faced with a unique, coated non-woven glass mat suitable for producing, in the resulting glass mat-faced gypsum board, a surface suitable for Level 4 finishing in the same manner as commercially available multi-ply paper-faced gypsum wallboard, i.e., a very smooth surface. This result can be achieved by using, as a facer material for making gypsum wallboard, a coated non-woven, glass fiber mat having the characteristics required by the present invention.

More particularly, applicant has found that a coated non-woven glass fiber mat which comprises, and which preferably consists essentially of, fibers having a diameter of no greater than about 11 microns, and preferably no less than about 8 microns and is bound together predominantly with an acrylic binder having a suitable softness, can be utilized with great advantage in the production a gypsum wallboard suitable for interior use. The coating on the glass mat is prepared by drying an aqueous mixture of (i) a mineral pigment, (ii) a polymer adhesive binder and optionally (iii) an inorganic adhesive binder. Preferably, the coating is applied to the glass mat before the glass mat is used to make gypsum wallboard. Such mat is referred to as pre-coated mat.

As used herein, the term "diameter" refers to the minimum thickness of fibers that may not have a substantially circular cross section.

The various levels of finishing gypsum board is described in Publication GA-214-96, Recommended Levels of Gypsum Board Finish available from Gypsum Associates, Washington, D.C., incorporated herein by reference in its entirety. Level 4 finishing is typically specified when flat paints, light textures or wall coverings are to be applied to the board surface. Thus, such a surface must be suitably smooth such that such wall finishes can be applied with minimal preparation and be aesthetically acceptable.

Non-woven glass mat suitable for use in the present invention can be prepared by a wet-laid process, which is carried out on what can be viewed as modified papermaking machinery. Descriptions of the wet-laid process for making glass mats may be found in a number of U.S. patents, including U.S. Pat. Nos. 2,906,660, 3,012,929, 3,050,427, 3,103,461, 3,228,825, 3,760,458, 3,766,003, 3,838,995, 3,905,067, 4,112,174, 4,681,802 and 4,810,576, all of which are incorporated herein by reference.

In general, the wet-laid process for making non-woven glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated from the mat of fibers.

Machines such as wire cylinders, Fourdrinier machines, Stevens Former, Roto Former, Inver Former and Venti Former machines and the like can be used to form the wet-laid mat. In such equipment, a head box deposits the slurry onto a moving wire screen. Suction or vacuum removes the water resulting in the wet-laid mat.

Because glass fibers do not disperse well in water, it has been the industry practice to provide suspending aids for the glass fibers. Such suspending aids or dispersants usually are materials that increase the viscosity of the aqueous medium. Suitable dispersants conventionally employed in the art include polyacrylamides, hydroxyethyl cellulose, ethoxylated amines and amine oxides. Other additives such as surfactants, lubricants and defoamers also conventionally have been added to the white water. Such agents, for example, further aid the wettability and dispersion of the glass fibers.

The fiber slurry deposited on the moving screen or cylinder is processed into a sheet-like non-woven fiber mat by the removal of water, usually by suction and/or vacuum devices, and typically is followed by the application of an adhesive binder to the mat. The adhesive binder composition is usually an aqueous-based fluid and is impregnated directly into the fibrous mat and set or cured immediately thereafter to provide the desired mat integrity.

The present invention depends upon the preparation of a unique non-woven glass fiber mat, which is then coated, to serve as the facing sheet of at least one surface of the inventive gypsum wallboard. The preparation of a suitable non-woven glass mat facer is the result of a judicious selection of an appropriate content of glass fibers, forming of the glass fibers into a non-woven mat under an appropriate set of operating conditions to produce ultimately a mat of a desired basis weight and then treating the non-woven mat with an appropriate adhesive binder. Of course, in the broad practice of the invention, a minor portion of the glass fibers can be replaced with organic fibers, especially synthetic fibers such as polyester fibers, at an increased cost.

The non-woven glass fiber mat used to prepare the gypsum wallboard of the present invention are prepared using glass fibers having a diameter, preferably of not less than about 8 microns and not greater than about 11 microns. The glass fibers can be E, C, T or S fibers or any known type of glass fiber of good strength and durability, though flame-attenuated fibers are usually not desired. Preferably, a major proportion of the fibers, more preferably at least about 75 wt % of the fibers and even more preferably essentially all of the fibers (i.e. consisting essentially of) have a diameter of not less than about 8 microns and not greater than about 11 microns. Additionally, it is preferred that there are essentially no fibers in the non-woven mat having a diameter of greater than about 13 microns.

The use of mats prepared from glass fibers having diameters of less than about 8 microns is undesirable because it is believed that the peel-strength, bonding ability and possibly the porosity of such mats (particularly after a coating is applied) precludes the preparation of acceptable gypsum wallboard. On the other hand, applicant expects that the use of mats prepared with too many fibers having a fiber diameter greater than about 11 microns will result in a non-woven mat, even after application of the coating as described below, that has a surface morphology that cannot be finished in an acceptable fashion, i.e., the surface is not smooth enough to be directly amenable to Level 4 finishing techniques as described above. Suitable fibers of the appropriate diameter for making a glass mat suitable for use in the present invention can be obtained, for instance, from Johns Manville and Owens-Corning.

Most, if not all of the fibers used to make the mat also should have a length somewhere between about one-quarter (¼) to about three-quarter (¾) inch, and more preferably from about one-quarter (¼) to about one-half (½) inch. Shorter fibers make formation of the mat more difficult; while too high of a proportion of longer fibers interferes with the preparation of a mat of a suitable surface morphology (smoothness) for level 4 finishing. Preferably, at least about 75 wt % of the fibers used to prepare the mat have a length between about one-quarter (¼) to about three-quarter (¾) inch and preferably between about one-quarter (¼) to about one-half (½) inch and more preferably at least about 90 wt % of the fibers used to prepare the mat have a length between about one-quarter (¼) to about three-quarter (¾) inch and more preferably between about one-quarter (¼) to about one-half (½) inch. For example, it is expected that a mat prepared using 75% by weight ¼ inch H fibers (about 10 microns in diameter) and 25% by weight ¾ inch H fibers will have a suitable surface smoothness.

Applicant also expects that in addition to the fiber diameter and fiber length, the weight per unit surface area at which the non-woven glass fiber mat is prepared also may have an influence on the surface properties (e.g., smoothness) and performance of the mat that makes a mat suitable for use in making a gypsum wallboard, amenable to Level 4 finishing techniques, by the conventional continuous gypsum board production method. More specifically, it is preferred that the non-woven glass fiber mat be prepared at a weight per unit surface area (hereinafter also referred to as the basis weight) of at least about 0.8 lb./100 ft.² but no greater than about 2.2 lb./100 ft² and at an uncompressed mat thickness in the range of about 25 to about 40 mils, with a thickness of about 33 mils being the most typical. Often a basis weight of 1 to 2 lb./100 ft.² should prove to be suitable. In some case, the basis weight of the non-woven mat may be between about 0.8 and 1.5 lb./100 ft.², or alternatively between 0.9 and 1.4 lb/100 ft.²

According to an especially preferred embodiment of the present invention, the non-woven fibrous mat used in making gypsum wallboard in accordance with the present invention consists essentially of a substantially random distribution of fibers having a diameter of about 11 microns (and not less than 8 microns) (preferably at least 90 wt. percent of the fibers have a diameter of about 10-11 microns) and at least 75 wt percent of the fibers have a length between about ¼ and about ¾ inch, preferably a length between about ¼ and about ½ inch (preferably at least 90 wt. percent of the fibers have a length between about ¼ and about ¾ inch and preferably between about ¼ and about ½ inch) and the mat has a basis weight of about 1.8 lb./100 sq. ft.

Non-woven mats suitable for use in the present invention typically will have an air permeability, prior to the application of any coating, of less than about 900 cfm (cubic feet per minute), and even more preferably less than about 800 cfm (measured using test method FG 436-910, which is incorporated herein by reference), but having an air permeability of at least about 400 cfm.

Following initial mat formation, an adhesive binder, preferably aqueous-based, is applied to the non-woven mat to create an integral structure. While urea-formaldehyde (UF) resins have commonly been used to make non-woven glass fiber mats, in order to realize the objectives of the present invention for using the mat-faced gypsum board for interior Level 4 finishing applications, use of predominantly an acrylic-type adhesive binder is required. The acrylic-based binder should constitute at least 75 wt. percent, preferably at least 80 wt. percent, more preferably at least 90 wt percent and most preferably the exclusive glass mat adhesive. Acrylic-type adhesive binders are polymers or co-polymers containing units of acrylic acid, methacrylic acid and their esters and related derivatives. Such polymers and copolymers can be either thermosetting or thermoplastic and are well known and are widely available commercially. As a result, such polymers do not need to be described in detail. Such polymers and copolymers usually can be put into aqueous solution or are supplied as an aqueous latex emulsion.

For example, it is expected that suitable adhesives, and particularly the preferred aqueous-based latex adhesives, can be made by emulsion polymerization using the following monomers: (meth)acrylic acid (where the convention (meth) acrylic is intended to embrace both acrylic and methacrylic), 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl(meth)acrylate, butyl(meth)acrylate, amyl(meth)acrylate, isobutyl (meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, octadecyl (meth)acrylate, stearyl(meth)acrylate, tetrahydrofurfuryl (meth)acrylate, butoxyethyl(meth)acrylate, ethoxydiethylene glycol (meth)acrylate, benzyl(meth)acrylate, cyclohexyl (meth)acrylate, phenoxyethyl(meth)acrylate, polyethylene glycol mono(meth)acrylate, polypropylene glycol mono (meth)acrylate, methoxyethylene glycol (meth)acrylate, ethoxyethoxyethyl(meth)acrylate, methoxypolyethylene glycol (meth)acrylate, methoxypolypropylene glycol (meth) acrylate, dicyclopentadiene(meth)acrylate, dicyclopentanyl (meth)acrylate, tricyclodecanyl(meth)acrylate, isobornyl (meth)acrylate, and bornyl(meth)acrylate. Other monomers which can be co-polymerized with the (meth)acrylic monomers, generally in a minor amount, include styrene, diacetone (meth)acrylamide, isobutoxymethyl(meth)acrylamide, N-vinylpyrrolidone, N-vinylcaprolactam, N,N-dimethyl(meth) acrylamide, t-octyl(meth)acrylamide, N,N-diethyl(meth) acrylamide, N,N'-dimethyl-aminopropyl(meth)acrylamide, (meth)acryloylmorphorine; vinyl ethers such as hydroxybutyl vinyl ether, lauryl vinyl ether, cetyl vinyl ether, and 2-ethylhexyl vinyl ether; maleic acid esters; fumaric acid esters; and similar compounds.

Acrylic polymers and copolymers particularly useful for making a glass mat suitable for preparing the glass mat-faced gypsum board of the present invention are thermoplastic materials having a glass transition temperature (GTT) of at least about 20° C., but not above about 115° C. Thus, thermoplastic acrylic polymers and copolymers having a glass transition temperature (GTT) of at least about 30° C., but not above about 55° C. would be especially suitable. Acrylic polymers and copolymers with a GTT of about 40° C. are particularly useful.

One suitable acrylic-type polymer or copolymer is Rhoplex® GL-618 available from the Rohm and Haas Company, which has a GTT of about 36° C.

The acrylic-type adhesive binder, preferably aqueous-based, can applied to the wet-laid, non-woven glass fiber mat using any suitable equipment, such as a curtain coater or a dip and squeeze applicator. In the drying and curing oven, the glass mat is heated to a temperature of up to about 250-300° F., for a period of time not usually exceeding 1 or 2 minutes and frequently less than 30-50 seconds to dry and if needed, cure the adhesive. The adhesive is applied in an amount sufficient to provide a integral, self-supporting mat. Suitable amounts are described in the aforementioned patents and in specific instances can be determined by routine testing.

Following formation of the non-woven glass fiber mat, the mat then is provided on one side with a coating of a dried, preferably aqueous mixture of (i) a mineral (inorganic) pigment or filler, (ii) a polymer adhesive (organic) binder and optionally (iii) an inorganic adhesive binder. Preferably, the coating is applied to the one surface of the glass mat before using the mat to prepare the glass mat-faced gypsum board of the present invention. Typically, the coating is applied by contacting the mat with an aqueous mixture containing the recited constituents and then drying/curing the mixture.

On a dry weight basis of the two essential components (100%) of the mineral pigment and organic binder, the organic binder, usually a latex adhesive, and preferably an acrylic-based adhesive comprises at least about 1% and usually no more than about 20% and most often less than about 17% by weight of the coating, with the balance being the inorganic, mineral pigment or filler. Optionally, an inorganic binder preferably comprising at least about 0.5% by weight, of the total weight of the dried (cured) coating, but no more than about 20% by weight of the coating also can be present. The weight ratio of the mineral pigment or filler to the polymer adhesive (organic) binder can be in excess of 15:1 and in some cases can be in excess of 20:1, but usually is at least about 5:1.

Suitable coating compositions for making the coated mat thus may contain, on a dry weight basis of the three noted components (100%), about 75 to 99 percent mineral pigment or filler, more usually about 80 to 95 percent mineral pigment or filler, about 0 to 20 percent inorganic adhesive, more usually about 0 to 10 percent and about 1 to 20 percent polymer adhesive (organic binder), usually about 1 to 17 percent and more usually about 1 to 12 percent.

As noted above, a mineral pigment or filler comprises the major component of the coating composition. Examples of mineral pigments suitable for making coated mats useful in the present invention include, but are not limited to, ground limestone (calcium carbonate), clay, sand, mica, talc, gypsum (calcium sulfate dihydrate), aluminum trihydrate (ATH), antimony oxide, or a combination of any two or more of these substances.

The mineral pigment is usually provided in a particulate form. To be an effective mineral pigment for making a coated mat for use in this invention, the pigment preferably has a particle size such that at least about 95% of the pigment particles pass through a 100 mesh wire screen. Preferably, the pigment has most of, if not all of, the fine particles removed. It has been observed that the presence of an excess amount of fine particles in the coating composition negatively impacts the porosity of the coated mat. A preferred mineral pigment is a limestone having an average particle size of about 40 µm. Such materials are collectively and individually referred to in the alternative as mineral pigments or as "fillers" throughout the remainder of this application.

The resin used in the coating also must satisfy a certain level of porosity when used in combination with the mineral filler in making a coated glass mat. The porosity test is conducted with a coated test mat prepared by coating a glass mat with an aqueous coating formulation and dried at 230° F. (110° C.) for 20 minutes. The coating formulation is prepared by combining the filler, the resin, usually a latex and preferably an acrylic-type latex, and any optional inorganic adhesive and blending thoroughly, such as for about 30 seconds. The aqueous formulation can be applied to the mat using a simple knife applicator to obtain a dry basis weight of about 22 grams of coating per sq. ft. on the glass mat.

The test for porosity following application and curing of the mat coating is a modification of the procedure of TAPPI T460, Gurley method for measuring the air resistance of paper. In this procedure, a sample of the coated mat (approximately 2 inches by 5 inches) is clamped between the 1 in$^2$ orifice plates of a Gurley Densometer, Model 4110. The inner cylinder is released and allowed to descend under only its own weight (i.e. by gravity alone) and the elapsed time (measured in seconds) between the instant the inner cylinder enters the outer cylinder of the apparatus until the 100 ml mark on the inner cylinder reaches (enters) the outer cylinder is recorded. The test then is repeated with the sample facing (oriented in) the opposite direction.

The porosity, reported in seconds, comprises the average of the two replicates for each sample. A suitable pre-coated glass fiber mat exhibits a porosity of less than about 45 seconds, preferably less than about 20 seconds. At porosities of higher than about 45 seconds, the coated mat-gypsum core interface is at a much higher risk of delamination (i.e., blister formation) as the water vapors seek a path to escape during curing of the board. Preferably, the porosity is also more than about 2 seconds, so as to minimize bleedthrough of gypsum during board manufacture.

Filler materials inherently containing some naturally occurring inorganic adhesive binder can be used to make the coated mat. Examples of such fillers, some listed with the naturally occurring binder, include (but are not limited to) the following: limestone containing quicklime (CaO), clay containing calcium silicate, sand containing calcium silicate, aluminum trihydrate containing aluminum hydroxide, cementitious fly ash and magnesium oxide containing either the sulfate or chloride of magnesium, or both. Depending on its level of hydration, gypsum can be both a mineral pigment and an inorganic adhesive binder, but it is only slightly soluble in water, and the solid form is crystalline making it brittle and weak as a binder. As a result, gypsum is not generally preferred for use as an inorganic adhesive binder.

Fillers, which inherently include an inorganic adhesive binder as a constituent and which cure by hydration, also advantageously act as flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Low cost inorganic mineral pigments such with the properties of those described in the preceding paragraph, thus, may provide three (3) important contributions to the coating mixture: a filler; a binder; and, a fire suppressor.

Examples of polymer binders include, but are not limited to: styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, their esters and derivatives thereof (acrylic-type polymers), such as styrene-acrylate copolymers. Most, if not all of these materials are available as latex formulations. Acrylic-type latex polymers are generally preferred.

In addition to the two essential components and the one optional component, the aqueous coating composition will also include water in an amount sufficient to provide the desired rheological properties (e.g., viscosity) to the composition, which is appropriate for the chosen form of application of the composition to and for retention on the surfaces of the glass fibers of the mat (including fibers within the interstices of the glass fiber mat), and other optional ingredients such as colorants (e.g., pigments), thickeners or rheological control agents, defoamers, dispersants and preservatives. Generally, the solids content of the aqueous coating formulation is between about 45% and 85% by weight. When used, the aggregate amount of such other ingredients in the coating composition is typically in the range of 0.1 to 5% and generally is not more than about 2% of the main, three noted components.

Any suitable method for applying an aqueous coating composition to the fibrous mat substrate can be used for making the coated mat, such as roller coating, curtain coating, knife coating, spray coating and the like, including combinations thereof. To achieve best properties in the coated mat and the resulting gypsum board, the coating is applied such that it penetrates into and envelopes the fibers of the glass fiber mat to a depth of from about 30 percent to about 50 percent of the thickness of the coated glass fiber mat. In this regard, reference is made to U.S. application Ser. No. 10/798,891 filed Mar. 12, 2004 and entitled Use of Pre-Coated Mat for Preparing Gypsum Board, which is incorporated herein by reference. Following application of the aqueous coating composition to the mat the composition is dried (cured), usually by heat to form the coated glass fiber mat.

In order for the pre-coated mat to be most useful in making the coated mat-faced gypsum board of this invention, it is preferred that the pre-coated mat be flexible enough to be rolled up into rolls of continuous sheet. As a result, the pre-coated mat should not be so stiff and brittle that it will break upon bending. To accomplish this objective, it appears that the inorganic adhesive binder content of the mat coating generally should not exceed about 20% by weight of the total dry weight of the coating, and usually is less than 10%. Likewise, the polymer binder has practical upper limits, as noted earlier, due to cost and a desire to limit the combustibility of the coating.

The amount of coating applied to the surface of the fibrous mat should be sufficient to coat the surface of mat with the coating composition, to the extent that the surface of the mat is directly suitable for Level 4 finishing. The amount of coating required is dependent, in part, upon the thickness of the mat. It is difficult to measure the thickness of the coating because of the uneven nature of the fibrous mat substrate on which the coating is applied. In rough terms, the thickness of the coating should be at least about 10 mils, but when the glass mat is relatively thin and the coating is efficiently dried, a coating as thin as 4 mils may suffice. In general, the thickness need not exceed about 30 mils.

A coated glass fiber mat for use in this invention can be prepared by applying an aqueous coating composition containing the noted solid constituents to a fiber mat in an amount on a dry weight basis equivalent to at least about 15 lbs., more usually between about 30 and 60 lbs., per 1000 sq. ft. of mat. Normally, the dry coating is present in an amount equivalent to at least about 45 lbs., most often between about 35 and 55 lbs., per 1000 sq. ft. of mat, depending upon the thickness of the glass fiber mat. Although higher or lower amounts of coating can be used in any specific case, it is believed that, for most applications, the amount of coating will fall within the range of about 30 to about 60 lbs per 1000 sq. ft. of mat (dry basis).

Following application of the aqueous coating composition to the mat the composition is dried (cured), usually by heat to form the coated mat. The coated mat made in accordance with these teachings allows water vapor to pass through. One suitable pre-coated mat is prepared by coating a glass fiber mat with an aqueous coating composition containing an acrylic binder and a platelet-type clay filler. The glass fiber mat has a basis weight of 1.8 lb./100 sq. ft. made solely with H fibers, 75% by weight of which are ¼ inch in length and 25% by weight of which are ¾ inch in length, and bound together with Rhoplex® GL-618 acrylic latex, cross-linked with a small amount of U-F resin. The binder comprises about 20% by weight of the glass fiber mat before the coating is applied.

FIG. 1 is a cross section of a wallboard 10 made in accordance with the present invention. FIG. 1 is not intended to be to scale; various angles, thicknesses and other dimensions are exaggerated for clarity and purposes of illustrating the invention. Wallboard 10 has a gypsum board core 12. Wallboard 10 has a first face 14, two edges 16, and a second face 18. First face 14 is covered over all (or substantially all) of its surface area with a coated non-woven glass mat 22 according to the present invention. Preferably, second face 18 also is covered with a non-woven glass fiber mat 24. As described below, the non-woven glass mat 22 is preferably a pre-coated non-woven glass fiber mat, with the coating on the surface of the mat opposite the gypsum core (i.e., on the free surface of the mat).

In wallboard made for interior finishing applications, first face 14 preferably has shaped regions 20 formed along marginal side portions of first face 14 adjacent to edges 16. Although wallboard 10 is shown with tapers, alternate shapes include a square edge, a bevel, a rounded edge and other shapes (not shown), can be used. First face 14 is covered over all (or substantially all) of its surface area with the coated glass fiber mat 22. Second face 18 is covered with a fibrous (preferably glass fibers) mat material 24. As described below, the mat material 24 is preferably also a coated glass fiber mat of this invention, with the coating on the surface of the mat opposite the gypsum core (i.e., on the free surface). Mat material 24 overlies the portion of first face 14, which wraps around the edges 16. Obviously, alternative ways of joining the facers together are possible.

Wallboard 10 can have varying thicknesses and widths as desired, as is well known. For a ½ inch nominal thickness wallboard, an exemplary taper may have a width w of approximately 2.5 inches and a height h of approximately 0.075 inches.

The gypsum core 12 of wallboard 10 of the present invention is basically of the type used in gypsum structural products commonly known as paper-faced gypsum wallboard, dry wall, gypsum board, gypsum lath and gypsum sheathing. The present invention is not limited to any particular core composition. The core of such a gypsum product is formed by mixing water with powdered anhydrous calcium sulfate or calcium sulfate hemi-hydrate ($CaSO_4 \cdot \frac{1}{2}H_2O$), also known as calcined gypsum to form an aqueous gypsum slurry, and thereafter allowing the slurry mixture to hydrate or set into calcium sulfate dihydrate ($CaSO_4 \cdot 2H_2O$), a relatively hard material. The core of the product will in general comprise at least about 85 wt. percent of set gypsum, though the invention is not limited to any particular content of gypsum in the core.

The composition from which the set gypsum core of the structural panel is made can include a variety of optional additives, including, for example, those included conventionally in gypsum wallboard and well known to skilled workers. Again, the present invention is not limited to and does not exclude any of the known gypsum core additives. Examples of such additives include set accelerators, set retarders, foaming agents, reinforcing fibers, and dispersing agents. Fungicides can be added, if deemed desirable. To improve the water-resistant properties of the core, the gypsum composition from which the core is made may also include one or more additives to improve the ability of the set gypsum composition to resist being degraded by water (for example, to resist dissolution).

The wallboard may contain wax or a wax emulsion as an additive to improve the water resistance of the gypsum core. The invention is not limited thereby, however, and examples of other materials which have been reported as being effective for improving the water-resistant properties of gypsum products include the following: poly(vinyl alcohol), with or without a minor amount of poly(vinyl acetate); metallic resinates; wax or asphalt or mixtures thereof, usually supplied as an emulsion; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogen-polysiloxanes, for example, of the type referred to in U.S. Pat. Nos. 3,455,710; 3,623,895; 4,136,687; 4,447,498; and 4,643,771, siliconates, such as available from Dow Corning as Dow Corning 772; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. Mixtures of these additives can also be employed. Within these classes of materials, poly(methylhydrogen-siloxane) is particularly preferred. When used, the amount of the organopolysiloxane should be at least about 0.2 wt. %. As noted above, the use of any particular water-resistant additive is optional.

Typically, the core of non-woven glass fiber mat-faced gypsum wallboard has a density of about 40 to about 55 lbs. per cu. ft., more usually about 46 to about 50 lbs per cu. ft. Of course, cores having both higher and lower densities can be used in particular applications if desired. The manufacture of cores of predetermined densities can be accomplished by using known techniques, for example, by introducing an appropriate amount of foam (soap) into the aqueous gypsum slurry from which the core is formed or by molding.

In accordance with the present invention, and as illustrated in FIG. 1, one surface of the core 12 of the gypsum board 10 is faced with a non-woven glass fiber mat 22. The non-woven glass fiber mat is initially prepared and then pre-coated, as described above, to make it directly suitable for Level 4 finishing techniques. Coincidentally, the coating also may make the facer and the resulting board resistant to moisture. The coating is sufficiently porous to permit water in the aqueous gypsum slurry from which the gypsum core is made to evaporate in its vaporous state therethrough during manufacture of the board. The coated mat is prepared in advance and is used in fabricating board.

One surprising aspect of the present invention is that the pre-coated mat of the noted fibers (fiber diameter and fiber length, and preferred mat basis weight) is able to provide a suitable level of porosity to enable the continuous preparation of a gypsum board by conventional commercial operation, without experiencing excessive delamination of the fibrous mat facer, while yielding a finished board that has the surface characteristics (e.g., smoothness) making it directly suitable for Level 4 finishing techniques.

As described in more detail below, wallboard can be efficiently made by forming an aqueous gypsum slurry which contains excess water and placing the gypsum slurry onto a horizontally oriented moving web of the coated glass fiber mat. Another horizontally oriented moving fibrous web, possibly of the same coated glass fiber mat is then placed on the upper free surface of the aqueous gypsum slurry. Following initial hydration and ultimately aided by heating, excess water evaporates through the mats as the calcined gypsum hydrates and sets.

FIG. 2 is a schematic drawing of a portion of a manufacturing line for producing gypsum wallboard according to the present invention. In conventional fashion, dry ingredients from which the gypsum core is formed may be pre-mixed and then fed to a mixer of the type commonly referred to as a pin mixer (not shown). Water and other liquid constituents, such as soap, used in making the core are metered into the pin mixer where they are combined with the desired dry ingredients to form an aqueous gypsum slurry 41, which emerges from a discharge conduit 40 of the pin mixer. Foam (soap) is generally added to the slurry, such as in the pin mixer, to control the density of the resulting core. Again, the method of making the core material for the gypsum board is not an essential part of the present invention and a wide variety of procedures can advantageously be used.

The slurry is deposited through one or more outlets of the discharge conduit 40 onto a horizontally moving continuous web of fibrous mat material 22 (the coated glass mat). The amount deposited can be controlled in manners known in the art. Mat material 22 is fed from a roll (not shown) with the coated side down, i.e., away from the deposited gypsum slurry. Prior to receiving the gypsum slurry 41, the web of mat material 22 is flattened by rollers (not shown) and scored by one or more scoring devices (not shown). Scoring allows the sides of mat material 22 to be folded upward to form the edges of the board, as described below.

Mat material 22 and the deposited gypsum slurry 41 move in the direction of arrow B. The moving web of mat 22 forms the first facing sheet of the wallboards being fabricated, and the slurry at least partially (and preferably, only partially) penetrates into the thickness of the mat and cures. On setting, a strong adherent bond is formed between the set gypsum and the glass fiber mat. The partial penetration of the slurry into the mat can be controlled according to methods known in the art such as, for example, controlling the viscosity of the slurry.

In conventional wallboard manufacture it also is known to apply a relatively thin coating of a higher density of the aqueous calcined gypsum slurry to the inside surface of either or both facers before applying the aqueous slurry of gypsum that forms the core. The facers with the thin gypsum slurry coating are then sandwiched together with the main core slurry to form a wet board. In a similar fashion, it also is known to apply a higher density of the aqueous calcined gypsum slurry along both edges (16 in FIG. 1) of the gypsum wallboard. These features can optionally be used in making gypsum wallboard in accordance with the present invention.

After the gypsum slurry 41 is deposited upon the web of mat material 22, the edges of that web are progressively folded (using equipment well-known to those skilled in the art) around the edges of the forming wallboard, and terminate on the upper surface of the slurry along the sides. A second fibrous web, possibly of the same coated glass fiber mat used for the first facer, 22, fed in the direction of arrow C from a roll (not shown), is applied to the upper surface of the gypsum slurry 41, and usually only slightly overlaps the folded-around edges of the (bottom) web of mat material 22.

Prior to applying the (top) mat 24 to the upper surface of the gypsum slurry, glue may be applied to the second fibrous web along portions that will overlap and be in contact with the folded-over first mat edges (glue application is not shown). Although the invention is not limited by the type of glue used, preferably non-starch-based glues are used. One suitable glue is a poly(vinyl alcohol) latex glue. Glues based on vinyl acetate polymers, especially a vinyl acetate which has been hydrolyzed to form a polyvinyl alcohol, are widely available commercially as white glues. After the (top) web 24 is applied, the "sandwich" of glass fiber mat, gypsum slurry and fibrous web material are pressed to the desired wallboard thickness between plates 50 and 52. Alternatively, the webs and slurry can be pressed to the desired thickness with rollers or in another manner. The continuous sandwich of slurry and applied facing materials then is carried by conveyor(s) 54 in the direction of arrow D. Slurry 41 sets as it is carried along.

Conventional methods for interior wallboard production form a shaped region at the edges of the bottom surface of the forming wallboard as it moves down the production line.

After being formed and after the gypsum has sufficiently set, the wallboard is typically cut to desired lengths and dried. To prevent the quality of the tapered edges from being degraded during drying, the board generally is turned over prior to drying.

Although not limited thereby, industrial drying conditions typically used in conventional continuous gypsum board manufacture also can be used in the manufacture of wallboard according to the present invention. Exemplary drying conditions include temperatures of about 2000 to about 600° F., with drying times of about 30 to about 60 minutes, at line speeds of about 70 to about 600 linear feet per minute.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims. Unless otherwise specifically indicated, all percentages are by weight. Throughout the specification and in the claims the term "about" is intended to encompass + or −5%.

The invention claimed is:

1. A gypsum wallboard comprising:
a gypsum core having a planar first face and a planar second face;
a coated non-woven glass fiber mat facing material suitable for level 4 finishing adhered to and covering at least one of the planar first face and the planar second face of the gypsum core, said coated non-woven glass fiber mat facing material having been contacted (i) on a non-coated side and (ii) during preparation of the wallboard with an aqueous gypsum slurry that sets to form the gypsum core,
wherein the non-woven glass fiber mat facing material comprises a majority of glass fibers of a fiber diameter between about 8 and about 11 microns and a fiber length between ¼ and ¾ inch, the glass fibers of the non-woven glass fiber mat facing material being bound together with an adhesive binder comprising an acrylic adhesive binder and
wherein the non-woven glass fiber mat facing material has a coating comprising a dried aqueous mixture comprising (i) a mineral pigment, (ii) a polymer adhesive binder and optionally (iii) an inorganic adhesive binder on a free surface of said non-woven glass mat facing material and said coated non-woven glass mat facing material has a porosity which allows water to evaporate through said coated non-woven glass fiber mat from the gypsum core during the preparation of the wallboard.

2. The gypsum wallboard of claim 1 wherein the non-woven glass fiber mat facing material has a basis weight of between 0.8 and 2.2 lb./100 ft.$^2$ 3. The gypsum wallboard of claim 1 wherein the non-woven glass fiber mat facing material has a basis weight of between 1 and 2 lb./100 ft.$^2$ 4. The gypsum wallboard of claim 1 wherein at least 75 weight percent of the glass fibers of the non-woven glass fiber mat have a fiber length between ¼ and ½ inch.

5. The gypsum wallboard of claim 1 wherein the coated non-woven glass fiber mat has essentially no fibers having a diameter greater than 13 microns.

6. The gypsum wallboard of claim 1 wherein the coating on the coated non-woven glass fiber mat has a dry weight basis of about 30 to about 60 pounds per 1000 square feet of said coated mat.

7. The gypsum wallboard of claim 1 wherein the adhesive binder comprises predominantly an acrylic adhesive binder and the acrylic adhesive binder is a thermoplastic.

8. The gypsum wallboard of claim 7 in which the thermoplastic acrylic adhesive binder has a glass transition temperature of at least about 20° C., but not above about 115° C.

9. A gypsum wallboard comprising:
a gypsum core having a planar first face and a planar second face;
a coated non-woven glass fiber mat facing material suitable for level 4 finishing adhered to and covering at least one of the planar first face and the planar second face of the gypsum core, said coated non-woven glass fiber mat facing material having been contacted (i) on a non-coated side and (ii) during preparation of the wallboard with an aqueous gypsum slurry that sets to form the gypsum core,
wherein the non-woven glass fiber mat facing material comprises glass fibers and wherein at least 75 wt percent of the glass fibers have a fiber diameter between about 8 and about 11 microns and at least 75 wt. percent of the glass fibers have a fiber length between ¼ and ¾ inch, the glass fibers of the non-woven glass fiber mat facing material being bound together with an adhesive binder comprising an acrylic adhesive binder and
wherein the non-woven glass fiber mat has a coating comprising a dried aqueous mixture comprising (i) a mineral pigment, (ii) a polymer adhesive binder and optionally (iii) an inorganic adhesive binder on a free surface of said non-woven glass mat facing material, and said coated non-woven glass mat facing material having a porosity which allows water to evaporate through said coated mat from the gypsum core during preparation of the wallboard.

10. The gypsum wallboard of claim 9 wherein the non-woven glass fiber mat facing material has a basis weight of between 0.8 and 2.2 lb./100 ft.$^2$ 11. The gypsum wallboard of claim 9 wherein the non-woven glass fiber mat facing material has a basis weight of between 1 and 2 lb./100 ft.$^2$ 12. The gypsum wallboard of claim 9 wherein at least 75 weight percent of the glass fibers of the non-woven glass fiber mat have a fiber length between ¼ and ½ inch.

13. The gypsum wallboard of claim 9 wherein the coated non-woven glass fiber mat has essentially no fibers having a diameter greater than 13 microns.

14. The gypsum wallboard of claim 9 wherein the non-woven glass fiber mat facing material has a basis weight of between 1 and 2 lb./100 ft.$^2$ 15. The gypsum wallboard of claim 9 wherein the adhesive binder comprises predominantly an acrylic adhesive binder and the acrylic adhesive binder is a thermoplastic.

16. The gypsum wallboard of claim 15 in which the thermoplastic acrylic adhesive binder has a glass transition temperature of at least about 20° C., but not above about 115° C.

17. The gypsum wallboard of claim 15 in which the thermoplastic acrylic adhesive binder has a glass transition temperature of at least about 30° C., but not above about 55° C.

18. The gypsum wallboard of claim 9 wherein the coating on the coated non-woven glass fiber mat has a dry weight basis of about 30 to about 60 pounds per 1000 square feet of said coated mat.

19. The gypsum wallboard of claim 18 wherein the gypsum core includes a water-resistant additive in an amount sufficient to improve the water-resistant properties of the core.

20. The gypsum wallboard of claim 19 wherein the water-resistant additive comprises at least one of a wax emulsion, an organopolysiloxane and a siliconate.

21. A gypsum wallboard comprising:
a gypsum core having a planar first face and a planar second face;
a coated non-woven glass fiber mat facing material suitable for level 4 finishing adhered to and covering at least one of the planar first face and the planar second face of the gypsum core, said coated non-woven glass fiber mat facing material having been contacted (i) on a non-coated side and (ii) during preparation of the wallboard with an aqueous gypsum slurry that sets to form the gypsum core,
wherein the non-woven glass fiber mat facing material comprises glass fibers wherein at least 90 wt percent of the glass fibers have a fiber diameter of about 11 microns and at least 90 wt. percent of the fibers have a fiber length between ¼ and ¾ inch, the glass fibers of the non-woven glass mat facing material being bound together with an adhesive binder comprising at least 90 wt. percent of an acrylic adhesive binder and
wherein the non-woven glass fiber mat has a coating of a dried aqueous mixture of (i) a mineral pigment, (ii) a polymer adhesive binder and optionally (iii) an inorganic adhesive binder on a free surface of said non-woven glass mat facing material and said coated non-woven glass mat facing material has a porosity which allows water to evaporate through said coated non-woven glass fiber mat from the gypsum core during the preparation of the wallboard.

22. The gypsum wallboard of claim 21 wherein the adhesive binder comprises predominantly an acrylic adhesive binder and the acrylic adhesive binder is a thermoplastic.

23. A gypsum wallboard comprising:
a gypsum core having a planar first face and a planar second face;
a coated non-woven glass fiber mat facing material suitable for level 4 finishing adhered to and covering at least one of the planar first face and the planar second face of the gypsum core, said coated non-woven glass fiber mat facing material having been contacted (i) on a non-coated side and (ii) during preparation of the wallboard with an aqueous gypsum slurry that sets to form the gypsum core,
wherein the non-woven glass fiber mat facing material consists essentially of glass fibers of a fiber diameter between about 8 and about 11 microns and a fiber length between ¼ and ¾ inch, the glass fibers of the non-woven glass fiber mat facing material being bound together with an adhesive binder comprising an acrylic adhesive binder and
wherein the non-woven glass fiber mat facing material has a coating comprising a dried aqueous mixture comprising (i) a mineral pigment, (ii) a polymer adhesive binder and optionally (iii) an inorganic adhesive binder on a free surface of said non-woven glass mat facing material and said coated non-woven glass mat facing material has a porosity which allows water to evaporate through said coated non-woven glass fiber mat from the gypsum core during the preparation of the wallboard.

24. The gypsum wallboard of claim 23 wherein at least 75 weight percent of the glass fibers of the non-woven glass fiber mat have a fiber length between ¼ and ½ inch.

25. The gypsum wallboard of claim 23 wherein the coating on the coated non-woven glass fiber mat has a dry weight basis of about 30 to about 60 pounds per 1000 square feet of said coated mat.

26. A gypsum wallboard comprising:
a gypsum core having a planar first face and a planar second face;
a coated non-woven glass fiber mat facing material suitable for level 4 finishing adhered to and covering at least one of the planar first face and the planar second face of the gypsum core, said coated non-woven glass fiber mat facing material having been contacted (i) on a non-coated side and (ii) during preparation of the wallboard with an aqueous gypsum slurry that sets to form the gypsum core,
wherein the non-woven glass fiber mat facing material consists essentially of glass fibers of a fiber diameter between about 8 and about 11 microns and a fiber length between ¼ and ¾ inch, wherein essentially no fibers have a diameter greater than 13 microns, and the non-woven glass fiber mat facing material has a basis weight of between 0.8 and 2.2 lb./100 ft.$^2$ and the glass fibers of the non-woven glass mat facing material being bound together with an adhesive binder comprising at least 90 wt. percent of an acrylic adhesive binder and
wherein the non-woven glass fiber mat has a coating of a dried aqueous mixture of (i) a mineral pigment, (ii) a polymer adhesive binder and optionally (iii) an inorganic adhesive binder on a free surface of said non-woven glass mat facing material, said coating having a dry weight basis of about 30 to about 60 pounds per 1000 square feet of said coated mat and said coated non-woven glass mat facing material has a porosity which allows water to evaporate through said coated non-woven glass fiber mat from the gypsum core during the preparation of the wallboard.

\* \* \* \* \*